Dec. 17, 1929.　　　G. A. ROBINSON　　　1,739,862
AUTOMATIC FILLING AND WEIGHING MACHINE
Filed Nov. 25, 1925　　7 Sheets-Sheet 1

Inventor.
George A. Robinson
Mauro, Cameron, Lewis & Kerkam
Attorneys.

Dec. 17, 1929.    G. A. ROBINSON    1,739,862
AUTOMATIC FILLING AND WEIGHING MACHINE
Filed Nov. 25, 1925    7 Sheets-Sheet 2

INVENTOR
George A. Robinson
Mauro, Cameron, Lewis & Kirkam
ATTORNEYS

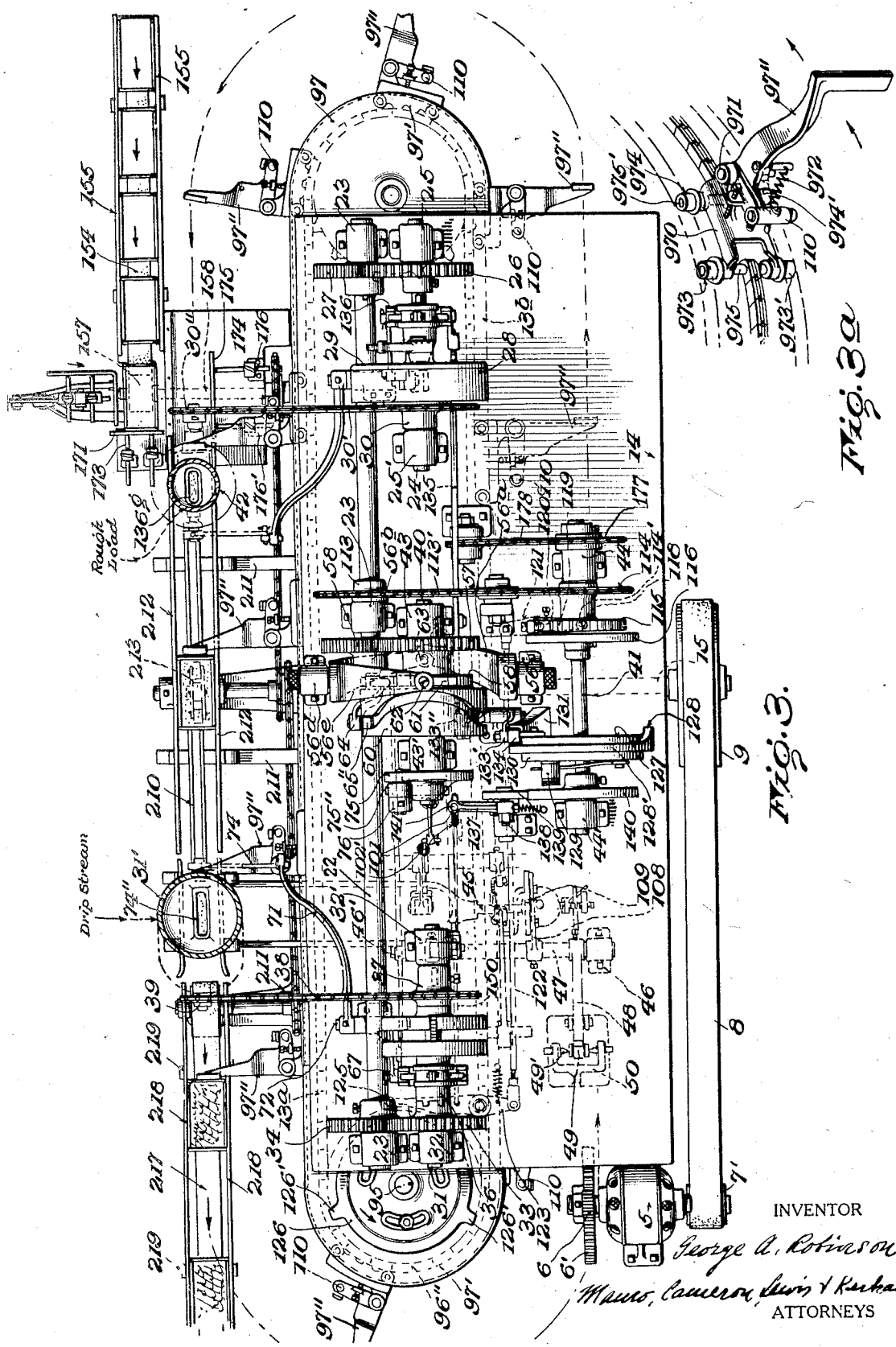

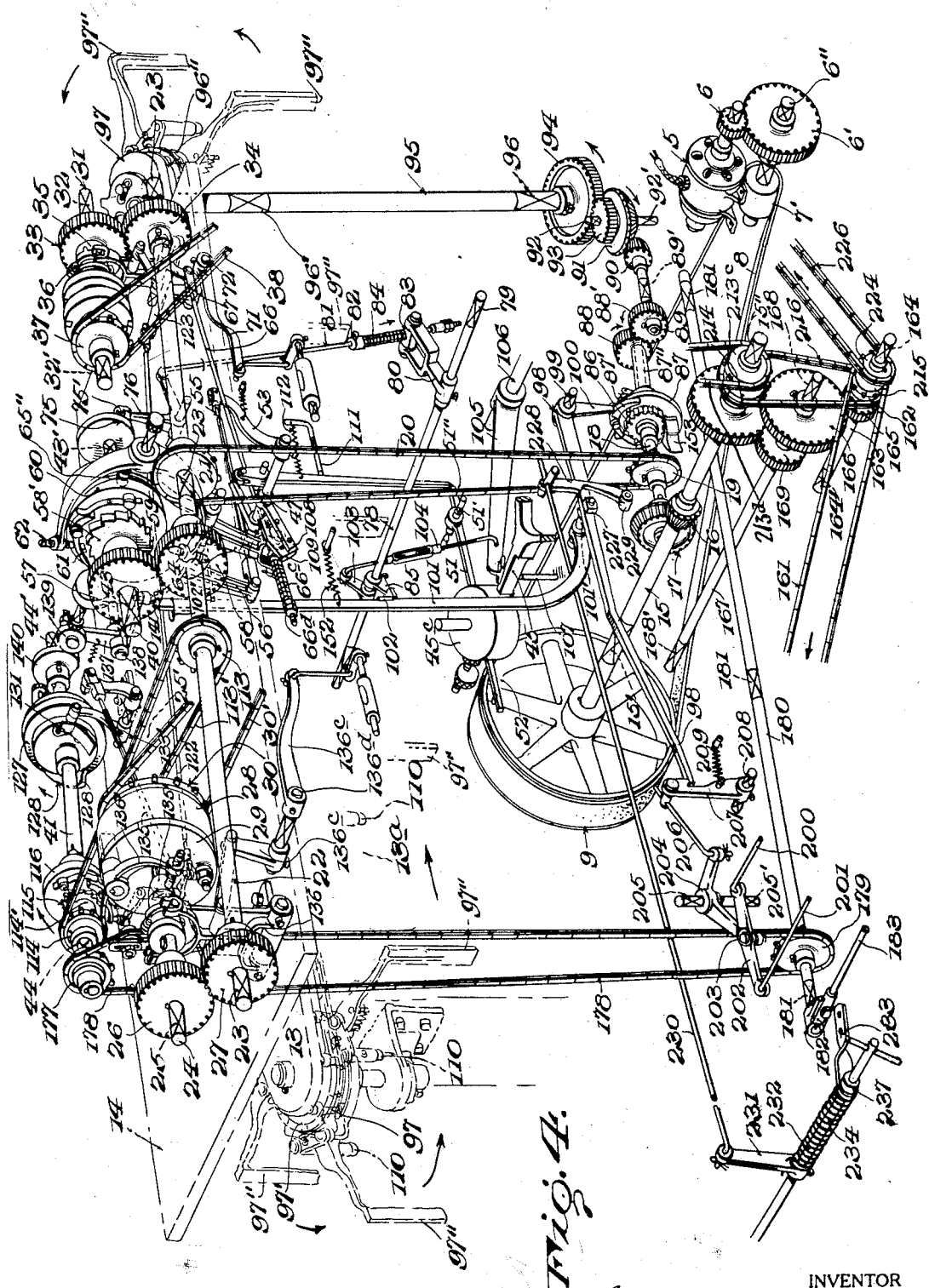

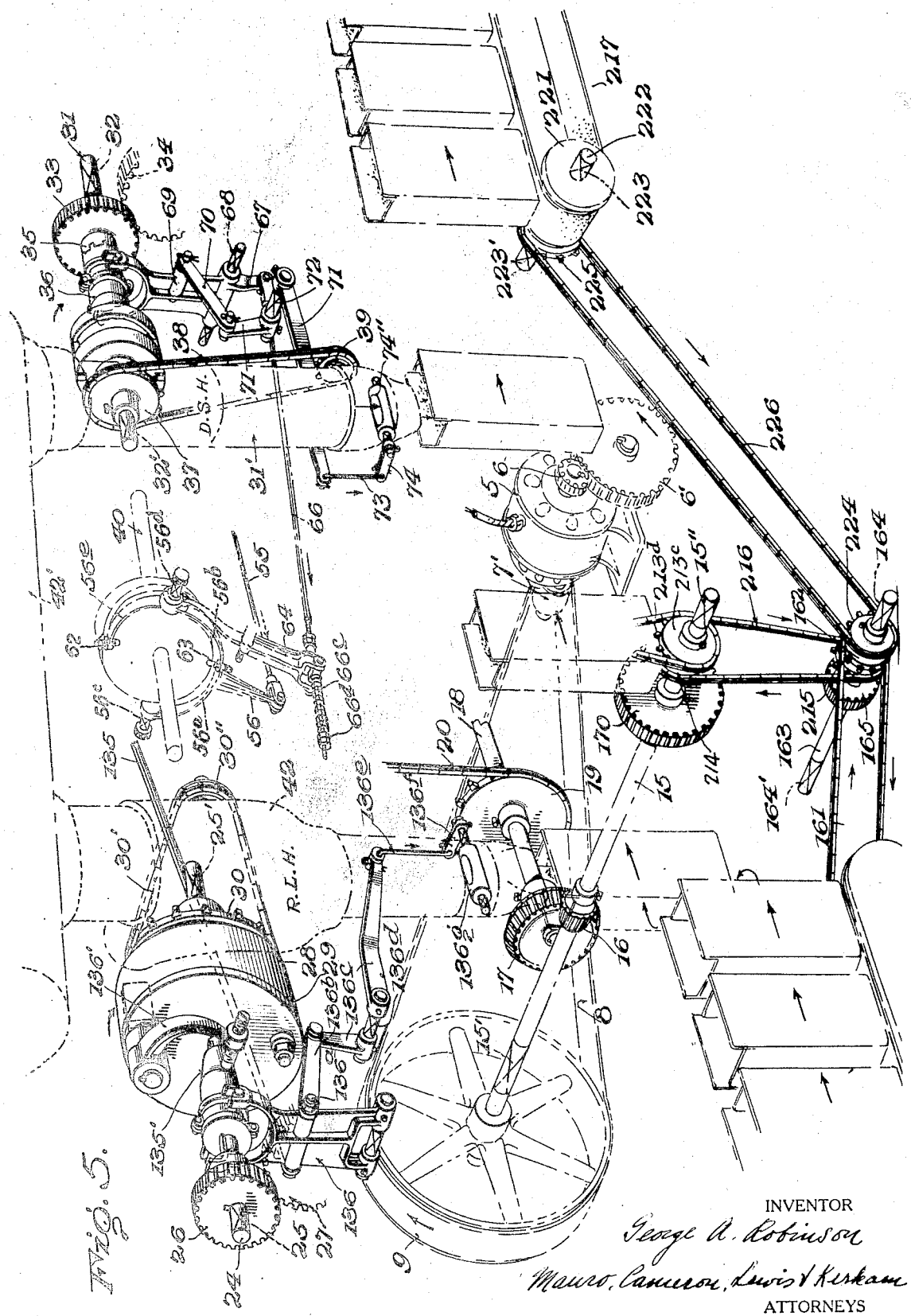

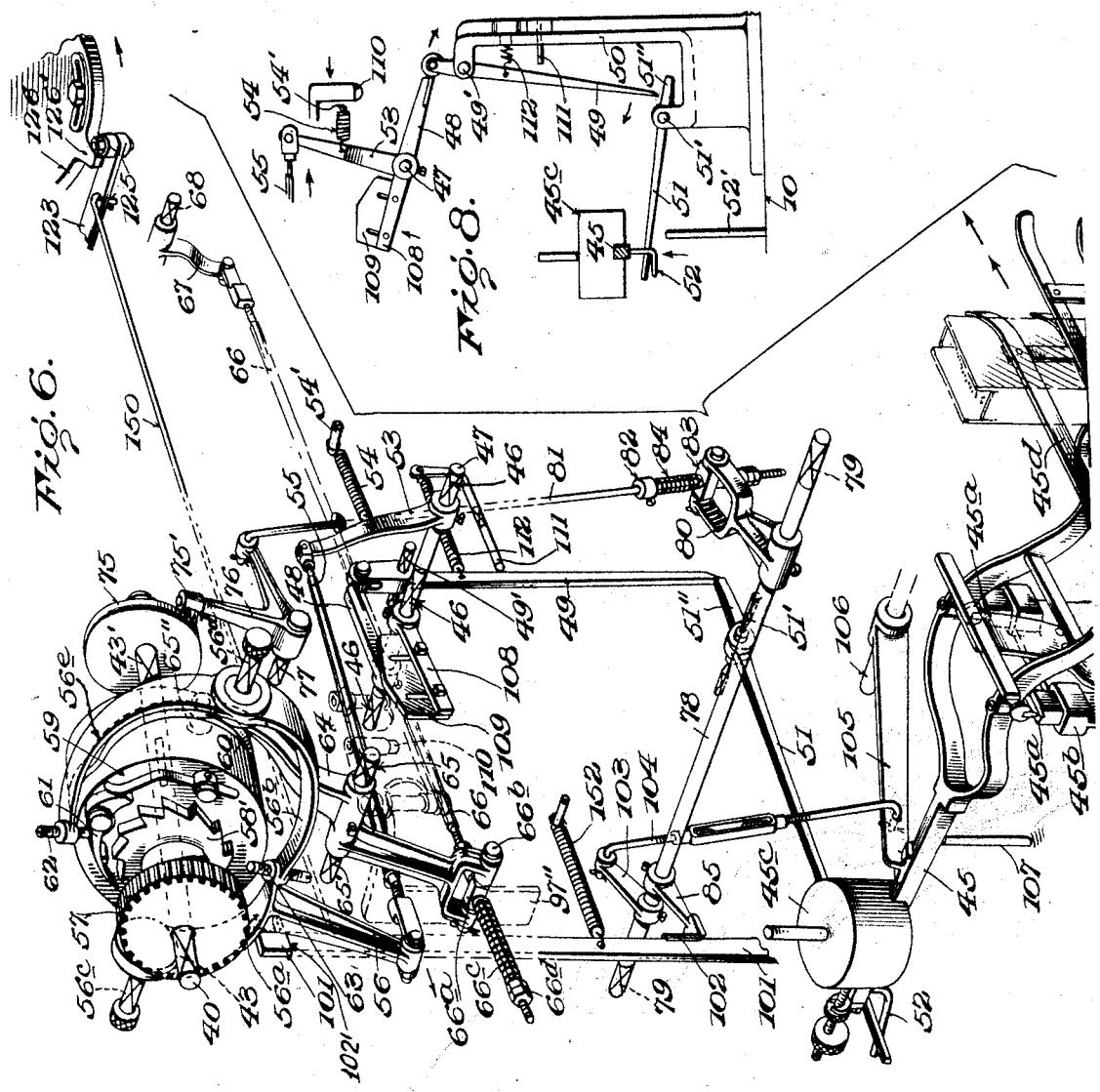

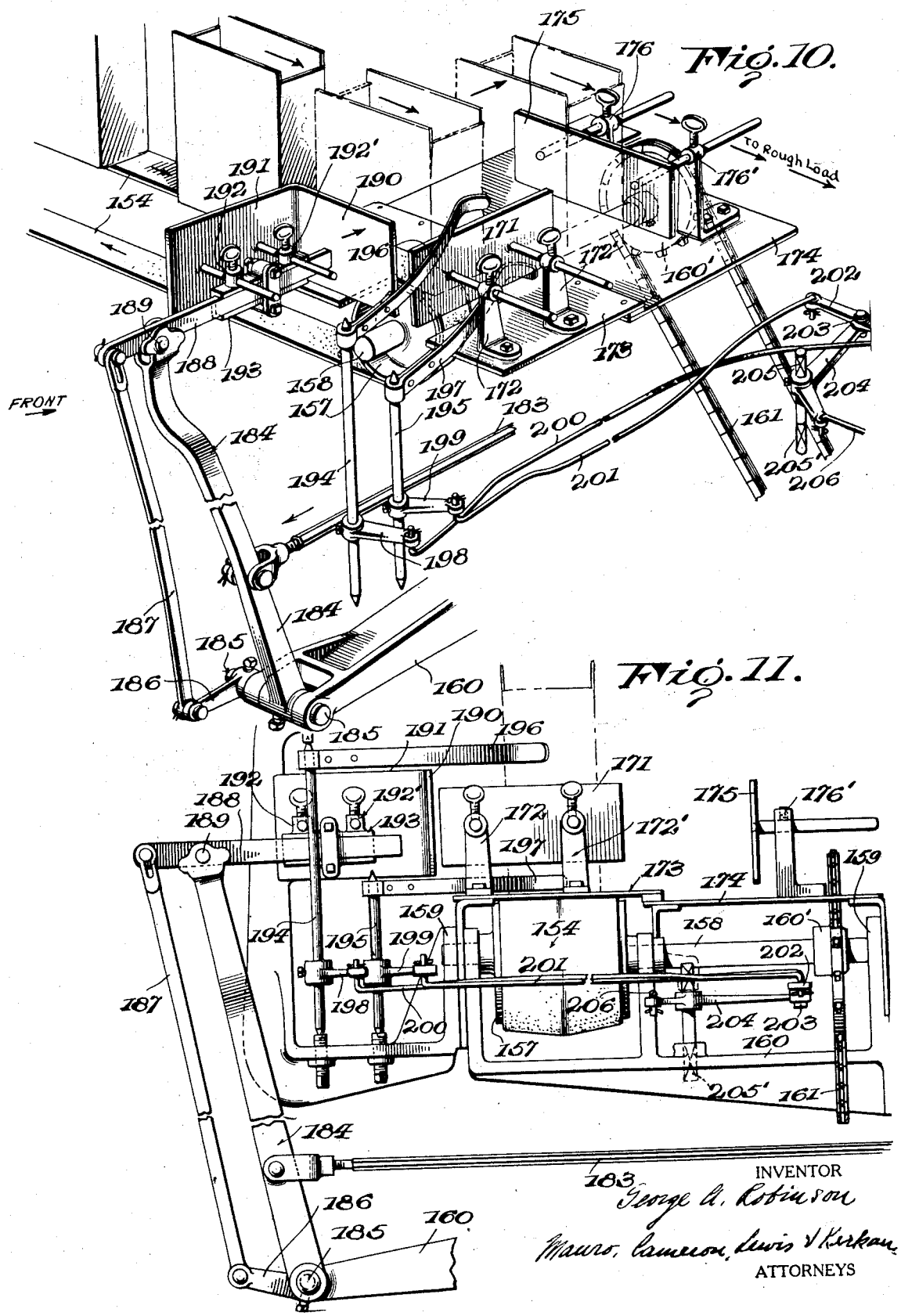

Patented Dec. 17, 1929

1,739,862

UNITED STATES PATENT OFFICE

GEORGE A. ROBINSON, OF BATTLE CREEK, MICHIGAN, ASSIGNOR TO JOHNSON AUTOMATIC SEALER CO., LTD., OF BATTLE CREEK, MICHIGAN, A PARTNERSHIP ASSOCIATION LIMITED

AUTOMATIC FILLING AND WEIGHING MACHINE

Application filed November 25, 1925. Serial No. 71,338.

This invention relates to carton filling and weighing machines, and more particularly to a machine of the type wherein the carton receives a preliminary or rough load at one position and is thereafter moved to another position where the carton is finally loaded and weighed.

It has heretofore been proposed to fill and weigh cartons in machines of the type referred to above, but all such machines with which I am acquainted have certain defects and disadvantages. In the first place, the various mechanisms are not located so as to be accessible for adjustments and repair in event a part or parts thereof fails to operate or function properly. Furthermore, the inaccessible location of the various parts interferes with proper lubrication thereof, with the result that the bearings and parts journaled therein soon become worn and require frequent repairs or replacement. Moreover, the principal working parts of the machine have heretofore all been located on one main shaft, so that, in the event of trouble with some particular part or parts, other parts have to be disassembled and removed from the machine in order to obtain access to the part to be repaired or replaced.

The principal objects of this invention are to provide a machine which, by reason of convenient location of the various parts, can be more readily and efficiently lubricated; which insures against loss of time in making repairs or replacements by grouping the cooperating parts in units and separately mounting the latter so that a part or unit can be removed from the machine without disturbing any other part or unit; which controls the operation of the filling, weighing, and carrier mechanisms through the medium of separate timing devices therefor; and which insures proper operation of the carrier and other mechanisms by the association therewith of safety devices controlling the same.

This invention may be embodied in a variety of mechanical expressions, one of which is shown in the accompanying drawings, but it is to be expressly understood that the drawings are for purposes of illustration only and are not to be construed as defining the limits of the invention, reference being had to the appended claims for this purpose.

In said drawings:—

Fig. 1 is a detail perspective view of a machine embodying this invention looking from the front thereof;

Fig. 1ª is a detail perspective view of timing means for a rough load hopper operating mechanism;

Fig. 1ᵇ is a detail perspective view of a carrier operated control for the timing means shown in Fig. 1ª;

Fig. 1ᶜ is a fragmentary sectional view of adjustable cams forming part of the timing means shown in Fig. 1ª;

Fig. 3 is a top plan view of the machine shown in Fig. 2;

Figure 1:
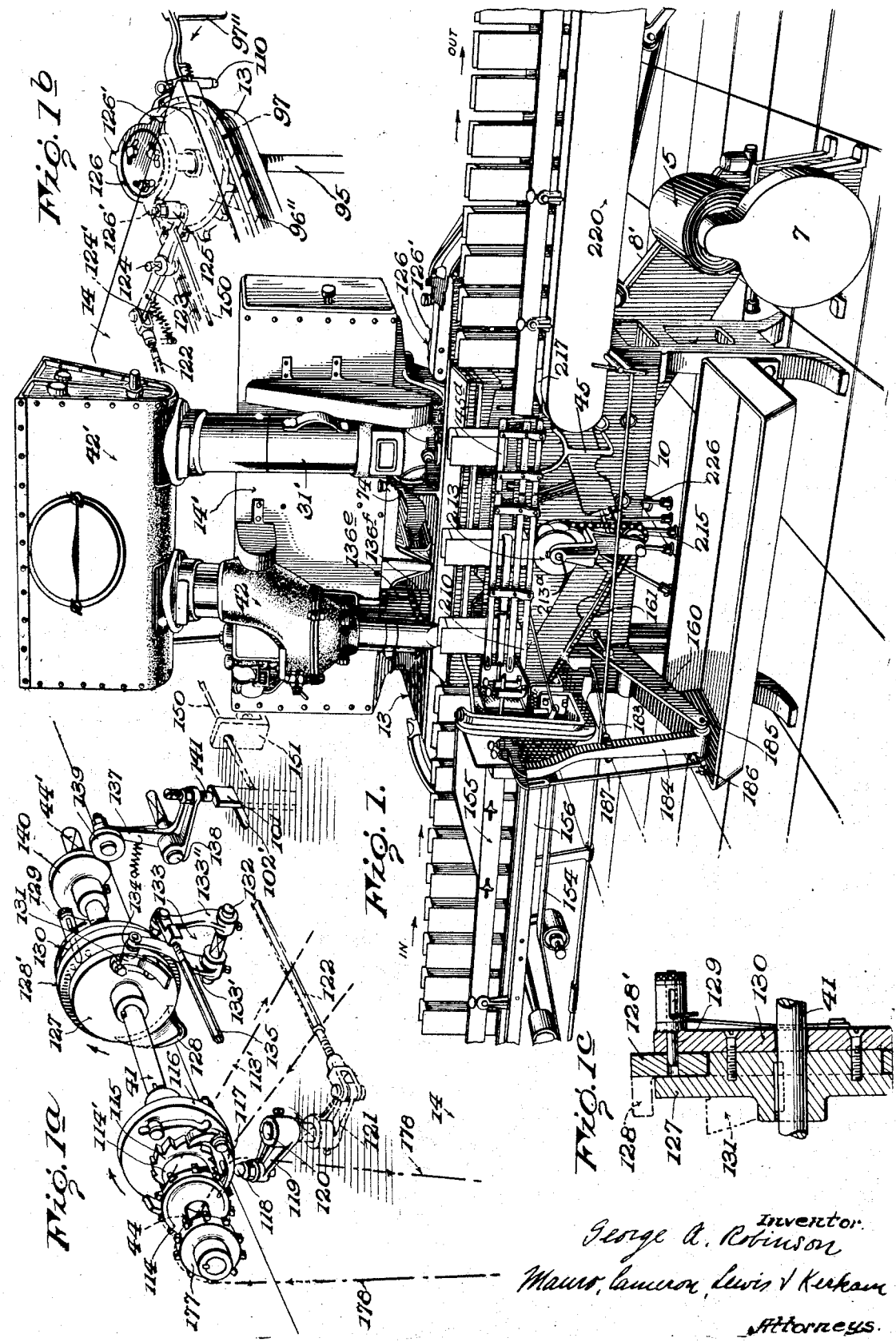

Fig. 3ª is a detail perspective view of a carrier finger;

Fig. 4 is a detail perspective view looking from the front of the machine, with parts thereof removed to more clearly show the principal operating mechanisms;

Fig. 5 is a detail perspective view looking from the front of the machine, showing rough load and drip stream hoppers and the path of travel of the cartons thereunder;

Fig. 6 is a detail perspective view looking from the front of the machine, showing timing means for the drip stream hopper and carton carrier, together with scale-operated trip control mechanism for said means;

Figs. 7 to 9 show respectively the positions of the various parts of the trip mechanism when the same is locked, tripped and being reset;

Fig. 10 is a detail perspective view of a carton pusher and a safety device associated therewith; and Fig. 11 is an end view of the pusher and safety device shown in Fig. 10.

Referring to the drawings, wherein the parts are shown in the position they occupy while the hoppers are delivering goods into the cartons, 5 indicates an electric motor the armature shaft of which carries a gear 6 meshing with a gear 6' mounted on the shaft 6" of a speed reduction unit 7 (Figs. 1 to 4). The shaft 6" carries a pulley 7' around which passes a belt 8 enclosed in a casing 8', the belt 8 also passing around a band wheel 9 carried on the main drive shaft of the machine. The machine is provided with a base 10, and supported on two uprights 11 and 12 is the carrier raceway 13 which guides the carrier fingers as they transfer the packages through the machine. Supported on the raceways 13, of which there are two, one 13$^a$ on front of the machine and one 13$^b$ on the rear, is a table 14 the top of which is a flat surface. On this table are mounted the bearings and brackets for the principal working parts of the machine which are enclosed in a removable casing 14'. These parts are separately mounted as individual units on this table and are all located on the upper part of the machine so as to be accessible for lubrication and repairs or replacement. The main drive shaft 15 is journalled in suitable bearings 15' and 15" in the base 10 and carries a small bevel gear 16 which meshes with a large bevel gear 17 on shaft 18 journalled in bearings 18' and 18" in the base 10. Mounted on shaft 18 is a sprocket wheel 19 which drives a chain 20 which chain passes around a sprocket 21 mounted on a main power shaft 22. This shaft 22 is carried in bearings 23, 23 on table 14, and extends the entire length of the machine. This shaft serves as a source of power for all the different units of the various mechanisms for operating the machine. A shaft 24 carried in bearings 25 and 25' is mounted on the table. Shaft 24 carries a gear 26 which meshes with a gear 27 mounted on the power shaft 22 and through the connection between these gears is continuously rotated. Mounted on shaft 24 is a clutch preferably of the well known expansion ring type, one member 28 of which is loose on the shaft and the other member 29 of which is fast on the shaft.

The loose member 28 of the clutch carries a sprocket 30 which, through a sprocket chain 30', drives the sprocket 30" of the agitating device (not shown) for the first or rough load hopper. At the opposite end of the machine a similar shaft 31 is carried in bearings 32 and 32'. Mounted loose on shaft 31 is a gear 33 which meshes with a gear 34 mounted fast on shaft 22 and, through the intermeshing of these gears, the gear 33 is rotated on the shaft 31 continuously. Gear 33 carries on its hub a toothed clutch member 35. Slidably mounted on the shaft 31 and keyed thereto is a toothed clutch member 36, which is adapted to be engaged by the clutch member 35 during certain portions of the cycle of operation of the machine. When these clutch members are engaged, the shaft 31 is rotated and when these clutch members are disengaged the shaft 31 is maintained stationary. Shaft 31 carries a sprocket wheel 37 which through a chain 38 drives a hopper agitator (not shown) through a sprocket 39, the form of this agitator depending on the character of goods being packaged. The operation of the shafts just described is controlled by timing shafts 40 and 41, one for each of the two operating shafts 24 and 31. The shaft 40 controls the operation of the shaft 31, which shaft operates the mechanism of the drip stream hopper 31' over the scale. The shaft 41 controls the operation of the shaft 24, which shaft is the operating shaft for the mechanism of the first or rough load hopper 42. The shaft 40 is mounted in bearings 43 and 43' and shaft 41 is mounted in bearings 44 and 44'. The hoppers 31' and 42 are supplied with material by a main hopper 42'.

Figure 2:
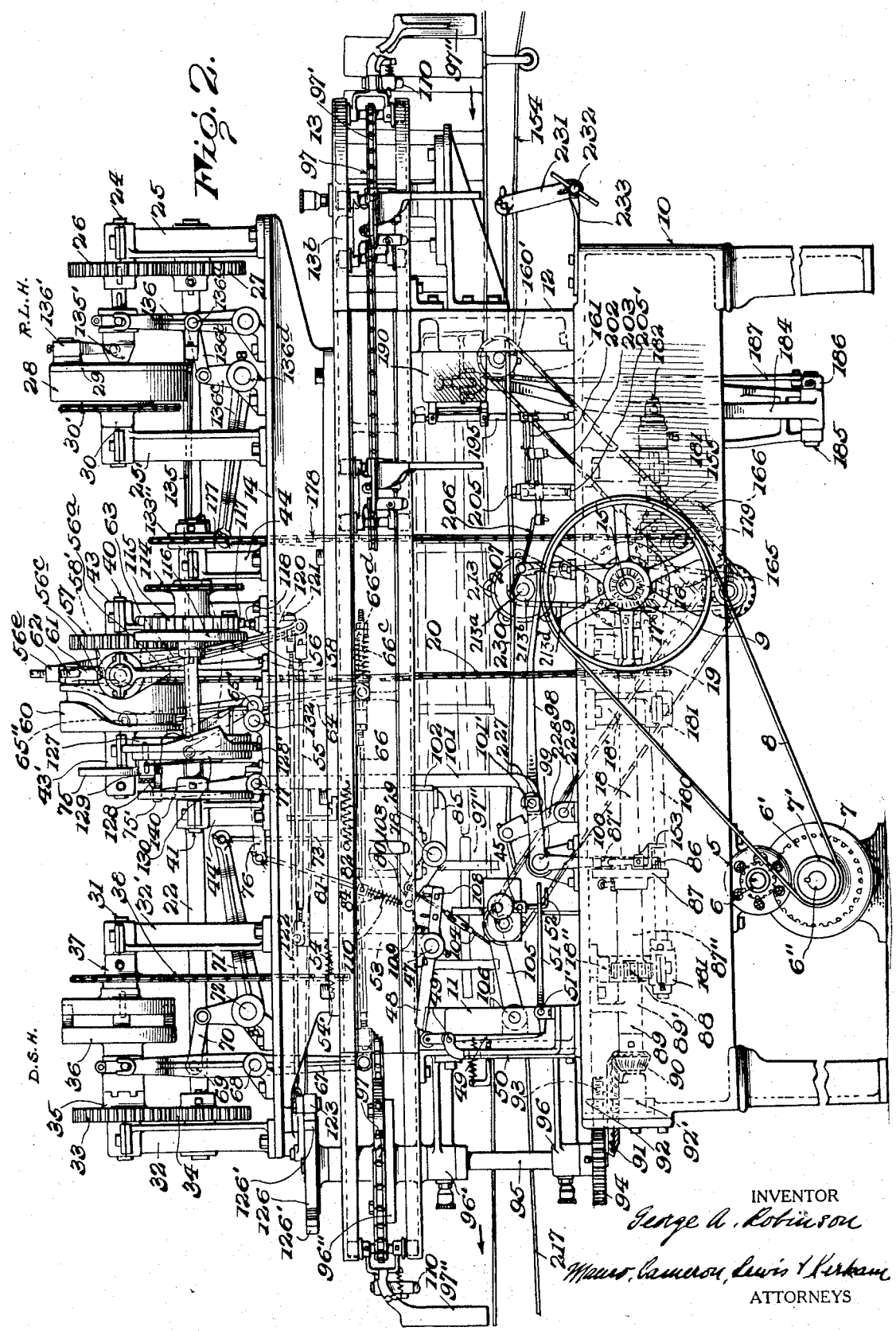
Fig. 2 is a rear elevation of the machine shown in Fig. 1, with portions thereof omitted for the purposes of clearer illustration.

In describing the operation of this machine, we will trace the same as regards the drip stream hopper operating mechanism and the scale without reference to the operation of the rough load hopper operating mechanism. Then the operation of the machine will be traced with respect to the rough load hopper operating mechanism without reference to the operation of the parts connected with the scale. It will be understood, however, that these two operations take place at the same time. Referring to Figs. 4 and 6, the scale beam 45 is mounted on knifeedge bearings 45$^a$, 45$^a$ on a bracket 45$^b$ secured to the base 10 of the machine and carries at one end an adjustable weight 45$^c$ and at its opposite end a pan or basket 45$^d$ which supports the carton under the hopper 31', while the former is being finally loaded and weighed. Consider that there is a package located on the scale pan or basket 45$^d$ which has previously been partially filled with material and has been transferred into position underneath the drip stream or scale hopper 31'. At this time the shaft 31 will be rotating by means of the clutch 35, 36 and through the chain drive 38 between sprockets 39 and 37 will be delivering goods to the package. The package when it attains the desired weight will cause the scale beam 45 to rise which, through tripping mechanism associated with the scale beam, will disengage the clutch 35, 36 on shaft 31 which will cause the shaft 31 to cease its rotation and stop the delivery of goods to the package. This disengagement of the clutch 35, 36 on the shaft 31 is obtained in the following manner:

Referring to Figs. 6 to 9, inclusive, which show the tripping mechanism as viewed from the front of the machine, there is mounted in bearings 46, 46, supported on the underside of the raceway 13, a shaft 47. Carried on shaft 47 is an arm 48 the outer end of which is engaged by the vertical tripping lever 49 piv- .oted at 49' on a bracket 50 mounted on the base 10 of the machine. The lower end of the vertical tripping lever 49 is engaged by one end of the horizontal tripping lever 51 pivoted at 51' on the bracket 50. The outer end of the lever 51 is positioned over a finger 52 which is rigidly attached to the scale beam 45. Mounted fast on shaft 47 is an arm 53 to which is attached a spring 54, the other end of the spring being attached to a stationary pin 54' carried by the machine framework. The effect of this spring 54 is to tend to move the arm 53 toward the right and to rock the shaft 47 in its bearings, but in the locked position of the parts (Fig. 7) and until the scale beam trips, said movement of the arm 53 is prevented by the engagement of lever end 51'' with the lower end of lever 49. Upon the rocking of the scale beam 45, the hook 52 comes into contact with the horizontal tripping lever 51 and raises its outer end, at the same time depressing end 51'' of the tripping lever 51 and moving the latter out of contact with the vertical tripping lever 49. The vertical tripping lever is then allowed to move under the pressure of the end of the arm 48 which is under the impulse of the spring 54, to the tripping position of the parts (Fig. 8). This allows the shaft 47 to rotate and the arm 53 is rocked toward the right. The arm 53 carries on its upper end a connecting rod 55, the other end of which is connected to an arm 56 (Figs. 4, 5 and 6) forming part of a yoke which controls the drip hopper timing shaft 40. This yoke comprises, in addition to arm 56, yoke arms 56ª and 56ᵇ journaled in bearings 56ᶜ and 56ᵈ on the machine framework and a yoke arm 56ᵉ curved upwardly and inwardly over the arm 56ᵇ. The shaft 40 is provided with a gear 57 loose thereon and which meshes with a gear 58 on the main power shaft 22 (Figs. 2, 3 and 4). Mounted fast on the sleeved hub of the gear 57 is a ratchet 58' which, with said gear, is continuously rotated on the shaft 40. Rigidly mounted on shaft 40 is a pawl carrier 59 and a cam 60, the pawl carrier 59 carrying a spring-pressed pawl 61 which forms a part of the clutch driving mechanism for operating shaft 40.

During the weighing operation of the machine, the pawl 61 is held out of contact with ratchet 58' in a position above the shaft, by the stud 62 mounted on the free end of the yoke arm 56ᵉ and shown clearly in Figs. 4 and 6. In this position, with the stud 62 in contact with the pawl 61, the pawl carrier 59, together with the cam 60 and the shaft 40, all remain stationary. Upon the tripping of the scale and the rocking of the shaft 47, and through the action of the connecting rod 55 on the lower end of yoke arm 56, the stud 62 is moved out of engagement with pawl 61 and the pawl is allowed to engage with the continuously rotating ratchet 58'. At this point the shaft 40, with the mechanism thereon, is allowed to rotate. The pawl stop yoke arm 56 is provided with a second stud 63 located diametrically opposite the stud 62 at the junction of arms 56ª and 56ᵇ and is so positioned relatively to the plane of the ratchet 58' that, when the yoke is rocked to move the stud 62 out of the path of the pawl 61, the stud 63 is moved into the path of the pawl. Consequently, when the shaft 40 has made a half revolution, the tail of the pawl 61 comes into contact with the stud 63 and is disengaged from the ratchet 58' causing the shaft 40 with the parts thereon, to come to rest in this position.

A lever 64, pivoted at 65, 65' on the machine framework, carries at its upper end a roller 65'' which engages with the curved path in the cam 60. During the half revolution of this cam, the arm 64 is caused to rock from the full-line position shown in the drawings. The arm 64 is resiliently connected at its lower end with one end of a connecting rod 66 extended through a swivel 66ª pivoted at 66ᵇ, the end of the rod 66 projecting through swivel 66ª being provided with a spring 66ᶜ, the tension of which may be regulated by a nut 66ᵈ. The other end of rod 66 is connected to one end of a lever 67 mounted on a shaft 68. The upper end of lever 67 engages with the sliding member 36 of the scale hopper operating clutch (Figs. 5 and 6). This half revolution of the cam 60, through the medium of connecting rod 66, causes the lever 67 to be rocked, and this movement of lever 67 disengages the clutch and thus stops the rotation of the shaft 31 and the operation of the agitating device in the hopper 31'. Mounted on arm 67 is a stud 69, to which is attached one end of a connection 70. The other end of the connection 70 is attached to one arm of a bell-crank 71 pivoted at 72. The other end of the bell-crank carries a connecting rod 73, the lower end of which is connected to the shutter operating lever 74 mounted near the bottom of the drip stream hopper 31'. When the lever 67 is rocked, the bell-crank 71 is also rocked with it, and through the connecting rod 73 and the arm 74 the shutter 74'' of the scale hopper is closed.

The package on the scale is now removed from the scale pan through the movement of carrier mechanism and a partially filled package is brought to the scale pan and is positioned ready to be filled and weighed. This mechanism now described is for starting the action of the carrier. The shaft 40 carries on its outer end a cam 75 which engages with a roller 75' on a bell-crank 76 pivoted at 77. Referring now to Figs. 2, 4, and 6, a rock shaft 78 is mounted in bearings 79 carried on the underside of the carrier raceway and carries an arm 80 mounted fast thereon. A connecting rod 81 is attached at one end to the bell-crank 76 and the other end of said connecting rod passes through a swivel connection on the end of the arm 80. The connecting rod 81 is provided with a collar 82 between which and the swivel 83 is interposed a spring 84 carried on the connecting rod. When the bell-crank 76 is rocked, the connecting rod 81 tends to move the arm 80 downward and to rock the shaft 78. When this shaft 78 is held stationary by means which will be described, the spring 84 is compressed and continues to hold the arm 80 under tension until such time as the arm 80 is free to move. Carried on shaft 78 is an arm 85 which extends substantially in the opposite direction to the arm 80.

Referring more particularly to Fig. 4, the shaft 18 is provided with a ratchet 86 keyed thereon. Mounted loose on shaft 18 is a pawl carrier 87 provided with a spring-pressed pawl 87' adapted to engage the ratchet 86. The pawl carrier 87 is provided with a hub 87" which carries at its outer end one of a pair of eccentric gears 88, 88'. The pawl carrier 87 and gear 88 are loose on shaft 18. Carried in a suitable bearing 89' is a shaft 89 on which is rigidly mounted the other eccentric gear 88'. The other end of this shaft 89 carries a bevel gear 90 which meshes with a bevel gear 91 mounted loose on a stud shaft 92 journalled in a bearing 92'. Mounted on the hub of the bevel gear 91 is a spur gear 93. Spur gear 93 meshes with a gear 94 rigidly mounted on a shaft 95 carried in bearings 96 and 96'. This shaft 95 carries between the raceways 13ᵃ and 13ᵇ a sprocket 96" about which the carrier chain 97 travels. The carrier chain 97 passes around a sprocket 97' at the opposite end of the machine and is provided with fingers 97" which transfer the packages through the machine during the operation of the carrier chain 97. The carrier fingers 97" (Fig. 3ᵃ) are each yieldably mounted on a plate 970, through the medium of a pivot pin 971 and a spring 972. Plate 970 carries at each end thereof a pair of rollers 973, 973' and 974, 974' and said rollers engage in grooves on the front and rear raceways so as to guide the carrier fingers and chain during movement of the same. The sections of the chain 97 are connected with the shafts 975 and 975' for the rollers and by the above-described construction of the carrier mechanism a part or parts thereof may be readily removed for repair or replacement without disturbing the remaining parts.

A pawl stop 98 pivoted at 99 has a downwardly extending arm 100 which normally engages the pawl 87' and holds it out of engagement with ratchet 86. Attached at 101' to the pawl stop 98 is a rod 101 provided with a latch plate 102 adapted to engage with one end of the arm 85 mounted on shaft 78. When the shaft 78 is allowed to rock through the action of the connecting rod 81 and the spring 84, the arm 85, through its contact with the latch plate 102 on the connection 101, raises the rod 101 and rocks the pawl stop 98 about its pivot 99. This movement of the pawl stop removes the end 100 of pawl stop 98 out of engagement with the pawl 87' and allows the latter to engage with ratchet 86. This engagement of the ratchet and pawl causes the pawl carrier and the eccentric gear 88 to rotate eccentric gear 88' and shaft 89 through one revolution, which, through the gears 90, 91, 93 and 94, drives the vertical shaft 95 and rotates the sprocket 96", thus moving the carrier chain 97 with the fingers 97" thereon. This shaft 95, together with sprocket 96", rotates through one-third of a revolution during each cycle of the machine. The pawl stop 98 is returned to its original position before the end of the rotation of the pawl carrier 87 to engage with the pawl 86' and stop the rotation of the pawl carrier. Mounted fast on the shaft 78 is an arm 103, the outer end of which is attached to one end of a connecting rod 104, the other end of said connecting rod being attached to an arm 105 pivoted at 106. The free end of this arm 105 is located directly above the scale beam 45 and when the shaft 78 rocks, this arm 105 is moved downward into contact with the scale beam and rocks the scale beam back into its initial position and into contact with stud 107. This resetting of the scale beam is obtained before the carriers start to move and the arm 105 holds the scale beam positively in this position while the package on the scale is being transferred therefrom and the package intermediate the hoppers is being moved onto the scale.

It is now desired to again resume the filling and weighing operation as soon as the carrier which transfers the packages comes to rest, and to start the operation of the scale hopper operating shaft 31. This is accomplished through the following mechanism. Referring again to Figs. 2, 4, and 6 to 9, the shaft 47 is provided with an arm 108 which carries a cam 109 adapted to be engaged by studs 110 carried on the carrier fingers 97". During the movement of the carrier chain 97 the stud 110 on one of the carrier fingers 97" comes into contact with the cam 109 and depresses said cam as the stud passes thereover, causing the shaft 47 to be rocked in the reverse direction moving the arm 53 toward the left and raising the arm 48 into its uppermost position. At this time the vertical tripping lever 49 is retracted against the stop 111 by the action of a spring 112 and the horizontal tripping lever 51 is rocked by its own weight into the position shown, namely, in close proximity with the lower end of the vertical tripping lever 49 (Fig. 9). This action of the cam 109 and the stud 110 on the carrier finger resets the tripping mechanism and the machine is again ready to weigh the package on the scale beam. During this action of resetting the tripping mechanism the arm 53 is moved toward the left as viewed in Fig. 9 and through the action of the connecting rod 55 attached to the pawl stop yoke arm 56 (Figs. 4 and 6) rocks the pawl stop yoke and moves the stud 63 out of engagement with the pawl 61. During this movement the stud 62 is again moved into position into the path of the pawl 61. This movement of the yoke allows the shaft 40 to make another half revolution and so complete one full revolution of shaft 40. During this second half revolution of the shaft 40 the arm 64 is rocked through the action of the cam 60 into its original position and through the connecting rod 66 and lever 67 the clutch 36 is again engaged with clutch 35 and the shaft 31 is rotated. This same movement of the lever 67 through its connection with bell crank 71 causes the shutter 74" of the scale hopper to be again opened. Through this action the material is again supplied to the package on the scale and the weighing operation is resumed.

The mechanism for supplying the first or rough load to the package will now be described. Shaft 41 is driven from the sprocket 113 mounted fast on shaft 22, by means of a sprocket chain 113' which passes around sprocket 113 and a sprocket 114 mounted loosely on shaft 41, (Figs. 1ᵃ and 4). Sprocket 114 is provided with a hub 114' which carries at its outer end a ratchet 115. Mounted fast on shaft 41 is a pawl carrier 116 which carries a spring-pressed pawl 117 adapted to engage ratchet 115. Pawl 117 is held out of engagement with the ratchet by a pawl stop 118 carried on one end of an arm 119 mounted fast on one end of a shaft 120 journalled on table 114. Mounted fast on the other end of shaft 120 is an arm 121 to the free end of which is attached one end of a connecting rod 122. The other end of the connecting rod 122 is attached to a lever 123 pivoted at 124 to a stationary part of the machine and movable from the position shown by a spring 124' (Figs. 1ᵇ and 2). The other end of the lever 123 carries a roller 125 which engages with a three-point cam 126 mounted on the upper end of shaft 95 which drives the sprocket 96" that moves the carrier chain 97. During the rotation of the shaft 95 and just before the shaft comes to rest, one of the cam portions 126' of the cam 126 engages the roller 125 on the arm 123 and rocks the arm about its pivot 124. This movement of the arm 123 moves the connecting rod 122 and through the arm 121 rocks the shaft 120 on the arm 119 and withdraws the pawl stop 118 out of engagement with the pawl 117. The pawl is thereby allowed to engage with the ratchet 115 and through this connection to rotate the shaft 41. Mounted on the shaft 41 is a disk 127 which is provided with an adjustable cam 128 carried by a ring plate 128' which is retained in its position on the hub of disk 127 by a pin 129 mounted on a plate 130 which is rigidly attached to the hub of the disk 127 (Figs. 1ᵃ and 1ᶜ). Carried also on the disk 127 is a cam 131. Pivoted at 132 is a double-armed cam lever 133, one arm 133' of which carries a roll 134 adapted to be engaged alternately by cam 131 and cam 128. The other arm 133" of the double-armed lever 133 is attached to one end of a connecting rod 135, the other end of which is attached to a lever 136 (Fig. 5). Upon the start of a rotation of shaft 41, the cam 131 contacts with the roll 134 and rocks the lever 133 and connecting rod 135 to the right. Movement of the connecting rod 135 and the lever 136 to the right, engages the expansion ring clutch 28, 29, by the camming action of cone sleeve 135' on the expansion ring spreading lever 136'. Shaft 24 and sprocket 30 are thereby rotated, and through the chain 30' and the sprocket 30", the agitator (not shown) in hopper 42 is operated. The arm 136 carries a stud 136ᵃ on which one end of a link 136ᵇ is pivoted. The opposite end of this link is pivoted on one arm of a bell-crank 136ᶜ journalled at 136ᵈ on the machine framework. The other arm of bell-crank 136ᶜ has pivotally connected therewith one end of a link 136ᵉ, the opposite end of which is connected with the operating arm 136ᶠ of a valve 136ᵍ controlling the discharge of material from the hopper 42. When the clutch 28, 29 is connected as above described, the parts are moved to the full line position shown in Fig. 5 and the hopper 42 delivers material into the carton which has been positioned thereunder by the carrier mechanism.

The further rotation of the shaft 41 causes the cam 128 to engage with the roller 134 and to rock the arm 133 in the reverse direction and through the connecting rod 135 to disengage the clutch 28, 29 on the shaft 24 and stop the delivery of material to the package. The amount of goods delivered by this rough load hopper is controlled by the length of time that the shaft 24 is allowed to rotate and this amount of rotation is controlled by the setting of the cam 128 in relation to the cam 131. In other words, if a greater amount of goods is desired, the pin 129 is withdrawn from engagement with the cam 128 and the cam 128 is rotated about the hub of the disk 127 to increase the circumferential distance between the cam 131 and the cam 128. If a lesser amount of goods is desired, the cam 128 is moved so that the distance between the cam 131 and the cam 128 is decreased and the pin 129 through its engagement with the cam 128 retains the cam 128 in whatever position it may be set.

While the package is on the scale beam the scale beam may be tripped at any time that the finished weight is attained in the package.

If the first load of material in the package is very nearly up to the final weight this tripping action of the scale may take place very quickly after the weighing operation is resumed. Conversely, if the first load of material is somewhat underweight, this tripping of the scale will be momentarily delayed. Since the transfer of the packages from the filling and weighing position by the carrier chain is directly controlled or set into operation by the tripping of the scale, it is desirable to insure that the carrier will not start its operation before the shaft 41 has completed one revolution even though the scale will trip prematurely. To this end, a safety device is provided to delay the tripping of the carrier driving mechanism until the shaft 41 has completed its revolution. The rod 101 which has previously been described in the operation of the carrier driving mechanism, is extended upward and beyond the latch plate 102 and the upper end of this connection is brought up through a slot 102' in the table 14 of the machine. Located directly above the end of rod 101 is one end of a spring-controlled bell crank lever 137 pivoted at 138 to a stationary part of the machine. Bell crank 137 carries on its upper end a roll 139 which engages with a cam 140 mounted fast on shaft 41. This cam 140 is circular in shape except at one point where it is provided with a recess and this recess is so located with respect to the other parts on shaft 41, that the roll 139 may drop into this recess while this shaft is stationary. The bell crank 137 carries a stud 141 which contacts with the connection 101. During the rotation of the shaft 41 the cam 140 rocks the lever 137 and holds the stud 141 down against the upper end of rod 101, and prevents the movement of said rod connection upwardly through the action of the tripping of the scale. At the end of the revolution of the shaft 41, the roller 139 drops into the recess in the cam 140 and so raises the stud 141 out of contact with the rod 101 and allows the free upward movement thereof to permit the tripping of the carrier starting mechanism. By this means it is assured that the carrier chain cannot be started and remove the package from under the first load hopper while the goods are being discharged from the hopper even though the scale should trip before this first filling operation was completed.

Referring to Figs. 1ª, 1ᵇ and 6, means are provided for disengaging the latch connection between the rod 101 and the arm 85 on shaft 78 after the rod 101 has been raised by the rocking of shaft 78. A connecting rod 150 is attached at one end to the lever 123 which has been previously described as the lever which starts the rotation of shaft 41. Near the other end of the connecting rod a bracket 151 supports the rod 150 and guides it in its movement. The end of the rod 150 is located in line with the rod 101. When the lever 123 is rocked on its pivot, it pushes the rod 150 toward the left and the contact of the connecting rod 150 with the rod 101 moves the latter to the left against the action of the spring 152 and disengages the latch connection between rod 101 and the arm 85. Upon the disengagement as described, the rod 101 and the bell-crank 98, to which it is attached, return to their normal position due to the weight of these parts. Means are provided on the pawl carrier 87 to insure this return movement if, for any reason, the weight of these parts should not bring them into position properly. This means comprises a cam 153 mounted on the face of the pawl carrier 87 which has a surface which engages the end 100 of the bell-crank lever 98 during the rotation of the pawl carrier and positively returns the bell-crank into its position in the path of the pawl 86'.

The empty cartons are transported from a suitable source of supply on a belt 154 and introduced into the machine by mechanism which will be presently described. Suitable guard rails 155, 155, are mounted at each side of the belt 154 on a frame 156 supported in any suitable manner. The end of the belt adjacent the machine passes around a pulley 157 mounted on a shaft 158 journalled at 159, 159 on a bracket 160 projecting from the front of the machine (Figs. 1, 3 and 11). Referring now to Figs. 4, 5, 10 and 11, the belt 154 is driven from the main power shaft 15 of the machine and for this purpose the shaft 158 carries a sprocket 160'. A chain 161 passes over sprocket 160' and a sprocket 162 fast on a shaft 163 journalled at 164, 164' on the base 10 of the machine. Shaft 163 carries a gear 165 fixed thereon, which meshes with a gear 166 fast on a shaft 167 journalled at 168, 168' on the base of the machine. A gear 169 fixed on shaft 167 meshes with a gear 170 mounted on the main drive shaft 15, and through the gears and connections above described said shaft serves to drive the belt 154. The cartons are delivered from the belt 154 against a stop plate 171 adjustably mounted in brackets 172, 172' secured to a table 173. The table 173 is supported from bracket 160 adjacent a table 174 also supported from said bracket and carrying a stop plate 175 for the cartons as they are introduced into the machine from the table 173. Stop plate 175 is adjustably mounted in brackets 176, 176' secured to table 174 and the carrier fingers travel over the latter forwardly of stop plate 175.

The mechanism for introducing the empty cartons from the table 173 into the machine will now be described. Mounted on the end of shaft 41 is a sprocket 177. A chain 178 passes over sprocket 177 and a sprocket 179 mounted on a shaft 180 journalled in suitable bearings 181, 181 on the base of the machine. The shaft 180 carries at one end a crank 182 to which is pivotally connected one end of a rod 183. The other end of rod 183 is connected to a lever 184 pivoted at 185 to the bracket 160 (Figs. 4, 10 and 11). The pivot 185 carries an arm 186, to the free end of which is pivotally connected the lower end of a link 187. The upper end of link 187 is pivotally connected with a bar 188 pivoted at 189 on the upper end of arm 184. Bar 188 carries an L-shaped pusher, one plate 190 of which moves the carton into the machine, the other plate 191 of the pusher acting as a stop for the cartons as the pusher moves in their path of travel on the belt 154. The pusher 190, 191 is adjustably mounted in bosses 192, 192′ of a bracket 193 mounted on the bar 188 and adjustable thereon. When the shaft 41 is rotated through one revolution, the shaft 180 is also rotated and the crank 182 through the connecting rod 183 rocks the arm 184 toward and away from the machine. During this movement, an empty carton is transferred from the table 173 by the pusher plate 190 onto the table 174 and positioned in front of one of the carrier fingers 97″. Upon the return movement of the pusher plate 190, the conveyor belt moves the line of cartons forward and brings a second carton into position against stop plate 171 so as to be introduced into the machine by the next inward movement of the pusher.

Means are provided whereby, if there is not a carton in position to be transferred into the machine, the carrier drive is held against operation until such time as an empty carton is brought in position to be transferred into the machine. This means consists of two vertical shafts 194 and 195 which carry, respectively, two fingers 196 and 197. The finger 197 is mounted near the conveyor belt and the finger 196 is mounted a little distance above it. The two shafts 194 and 195 are each provided with arms 198 and 199, respectively, the free ends of these arms being attached to the outer ends of connecting rods 200 and 201. The inner ends of these connecting rods are attached to opposite ends of a rocker lever 202. This rocker lever is pivoted, at its middle position 203, to one arm of a bell-crank 204 carried in bearings 205, 205′ on a stationary part of the machine. The other end of the bell-crank 204 is attached to one end of a connecting rod 206, the other end of which is connected with a latch 207 pivoted at 208 to a stationary part of the machine. This latch is held normally in engagement with the pawl stop or bell-crank 98 through the action of a spring 209, one end of which is attached to the latch 207 and the other end attached to a stationary part of the machine. When the carton on the conveyor belt is brought into position in front of the pusher plate 190, the carton is engaged by the two fingers 196 and 197 and the continued movement of the carton toward the stop plate 171 carries the fingers forward and rocks the two shaft 194 and 195 on their pivot. By this action the connecting rods 200 and 201 are moved in a direction to rock the bell-crank 204 to move the connecting rod 206 and rock the latch 207 out of engagement with the bell-crank 98 which allows the bell-crank 98 to move freely under the impulse of the rod 101. The finger 196 is located above the finger 197 a distance greater than the width of a carton so that, if a carton falls down on the conveyor belt and is not brought into the machine in an upright position, the carton will contact with the finger 197 only and move this finger to rock the shaft 195. The connecting rod 201 attached to the arm 199 on shaft 195 will then be moved and, as there is no resistance against the finger 196, the double arm 202 will rock about the pivot 203 and, through the connecting rod 200 and the arm 198, will rock the shaft 194 in a reverse direction to swing the finger 196 over the carton being brought to the machine on the conveyor belt. Thus, the rocker arm 202 will move freely about its pivot 203 on the bell-crank 204 and the bell-crank 204 will not be rocked and the connection 206 will not be moved to withdraw the latch 207 out of engagement with the bell-crank 98. This will prevent the starting of the carrier until such time as the carton is removed from the belt and a second carton properly positioned in front of the pusher plate 190.

As the empty cartons are pushed in front of the carrier fingers 97″, the latter carry each carton along a way or track 210 (Figs. 1 and 3) extending below the hoppers 42 and 31′. The track 210 is supported from the base 10 of the machine by brackets 211, 211 and is provided with the usual guard rails 212, 212. As each carton is pushed along the track by one of the fingers of the intermittently movable carrier mechanism, the carton reaches a position below the rough load hopper 42. At this time the carrier mechanism is automatically stopped and a rough or preliminary load is delivered into the carton from the hopper 42. The carrier then moves the carton to a position intermediate the hoppers and at the same time another carton is moved under the hopper 42. At the same time a carton which has previously been moved by the carrier onto the scale pan or basket 45$^d$ is removed therefrom by the adjacent finger of the carrier. The scale pan or basket 45$^d$ is alined with the way or track 210 and forms a part thereof, as clearly shown in Figs. 1 and 3. At the position of the cartons intermediate the hoppers, a jogger wheel 213 is provided for striking the bottom of the rough loaded cartons so as to shake and settle the material therein. Said wheel is loosely mounted on a shaft 213$^a$ and driven by a sprocket 213$^b$ fast on the hub of the wheel 213, a sprocket 213$^c$ loose on the shaft 15, and a chain 213$^d$ which passes around the sprockets 213$^b$ and 213$^c$. The sprocket 213$^c$ has fixed thereon a sprocket 214 driven by a chain 216 that passes around a sprocket 215 fixed on the shaft 163.

As the filled and weighted cartons are removed from the scale pan 45$^d$ and track 210, they pass onto a belt 217 which carries the cartons away from the machine. Guard rails 218, 218 are provided at each side of belt 217 and carried by a frame 219 supported in any suitable manner. The belt 217 is preferably enclosed at each edge by a casing 220, and the end of this belt adjacent the machine passes around a pulley 221 (Fig. 5). Pulley 221 is fixed on a shaft 222 journalled at 223, 223' on the machine framework. The pulley 221 and belt 217 are driven from shaft 163 by a sprocket 224 thereon, a sprocket 225 fast on shaft 222 and a chain 226 which passes around sprockets 224 and 225.

The starting and stopping of the machine is controlled through the carrier mechanism and for this purpose the pivotal connection 101' for the rod 101 with the bell-crank 98 is provided with a lug or nut 227 which when the machine is stopped is engaged by a latch 228 pivoted at 229 on the machine framework (Figs. 2 and 4). The latch 228 is pivotally connected with one end of a rod 230, the opposite end of which is connected with an arm 231 fixed on a shaft 232 journalled on a bracket 233 secured to the base 10 of the machine. Shaft 232 is provided with a collar 237 which bears against one face of the bearing 233. Between the bearing 233 and the arm 231 is a spring 234 under tension and which tends to hold the collar 237 against the bearing 233 to retain the shaft 232 in whatever position it may be turned by the frictional contact between the collar 237 and the face of the bearing 233.

When it is desired to stop the operation of the machine the shaft 232 is rotated by hand counter clockwise as viewed in Figure 4 and through the action of the connecting rod 230 attached to the latch member 228 the tripping lever 100 is restrained from moving. When it is desired to start the machine again the shaft 232 is rotated in a clockwise direction and the latch member 228 is thrown out of engagement with the nut 227 and the tripping lever 100 is allowed to move and thus start the operation of the machine. The operation of the machine will be clearly understood from the foregoing and may be briefly summarized as follows. Empty cartons are fed to the machine by belt 154, and after each operation of the carrier 97, the foremost empty carton is pushed under the rough load hopper 42 by the pusher 190. During each operation of the carrier it pushes a filled and weighed carton from the scale pan 45$^d$ onto the delivery belt 217, moves a rough loaded carton onto said pan from a position intermediate the hoppers 42 and 31', and forwards the rough loaded carton from the hopper 42 to said intermediate position. The machine, as before stated, is illustrated with the parts shown in the positions occupied thereby when material is being loaded in cartons below the hoppers 42 and 31'.

Under these conditions, clutches 28, 29 and 35, 36 will be connected respectively and the parts actuated thereby operate to hold the valves 74'' and 136$^g$ open to deliver material into the cartons. Shaft 40 remains inactive during the filling operation and the carrier 97 is stopped with one of the cam portions 126' engaging roller 125 to remove pawl stop 118 from pawl 117 and thereby permit rotation of shaft 41 through engagement of said pawl with ratchet 115.

When the package on scale pan 45$^d$ is finally filled to predetermined weight, scale beam 45 tilts upwardly and the trip mechanism connections therefor with arm 56 are actuated so that said arm is moved by spring 54 and rod 55 to disengage stud 62 from pawl 61. Said pawl then engages ratchet 58' whereupon shaft 40 starts a half revolution during which clutch 35, 36 is disconnected by cam 60 through the connections therefor with arm 67. When the clutch 35, 36 is disconnected valve 74'' is closed to stop the discharge of material from hopper 31'. While cam 60 is operating to disconnect the clutch 35, 36, the clutch 28, 29 which has been connected through movement of arm 133' imparted thereto by cam 131, is disconnected to close the valve 136$^g$, by cam 128 which engages said arm and moves it in the opposite direction. The roller 139 thereafter enters the recess in cam 140 and bell crank 137 is moved to lift stud 141 out of engagement with rod 101. The rod 101 then moves upwardly through the action of spring 84 and arm 85, said spring having been previously compressed by collar 82 when rod 81 was moved downwardly on rotation of cam 75 with shaft 40.

Upon upward movement of rod 101, arm 100 is moved out of the path of pawl 87' which then engages ratchet 86, thus rotating pawl carrier 87 and through the connections therefor with the carrier 97, starting the operation of said carrier.

When the carrier starts to operate, roller 125 is moved slightly further to the left (Fig. 1$^b$) by the cam portion 126' engaged therewith, whereupon rod 150 moves rod 101 (Fig. 4) to the left and breaks the latch connection 85, 102. Rod 101 then drops by its own weight, causing arm 100 to move back into the path of pawl 87', which, when shaft 18 has made a full revolution, is disengaged from the ratchet 87' by said arm to stop the operation of the carrier 97. When the carrier started, however, roller 125 moved off the adjacent cam portion 126' so that spring 124' actuated arm 123 and rod 122 to move pawl stop 118 back into the path of travel of pawl 117 and disengage it from the ratchet 115, this disengagement of the pawl 117 and the ratchet 115 preventing rotation of shaft 41 during operation of the carrier.

While the carrier 97 is moving, one of the studs 110 engages cam 109 on arm 48, whereby arm 53 is swung to the left to provide for resetting of the trip mechanism controlled by scale beam 45. When said stud passes off cam 109, lever 53 is returned to a substantially vertical position by spring 54 and retained in said position by arm 48 and lever 49 until the scale beam 45 is again tilted. The last described movement of arm 53 moves stud 63 into the path of pawl 61 to disengage the same from ratchet 58' and stop rotation of shaft 40 at the end of a half revolution thereof. At the end of said half revolution of the shaft 40, pawl 87' is disengaged from ratchet 86 to stop the operation of the carrier 97, and at the same time, cam 60, through the connections therefor with the clutch 35, 36 engages the parts thereof and starts the operation of the drip stream hopper. Just before the carrier stops, however, another cam portion 126' engages roller 125, whereupon lever 123 and rod 122 are actuated to disengage pawl stop 118 from pawl 117, the latter then engaging ratchet 115 so that cam shaft 41 begins to rotate and cam 131 actuates the arm 133' to connect the clutch 28, 29 and start the operation of the rough load hopper 42.

It will, of course, be understood that when the rod 101 is tripped, the arm 105 moves the scale beam 45 downwardly so that the scale pan 45ᵃ returns to the level of the carton runway and facilitates removal of the filled and weighed package from said pan by the carrier mechanism. The cycle of operation above described is intermittently repeated during the filling and weighing of the empty cartons, it being, of course, understood that in a full revolution of the shaft 40, the studs 62 and 63 are alternately moved in and out of the path of travel of the pawl 61 to stop and start the rotation of said shaft.

From the foregoing it will appear that various operating mechanisms of the machine are grouped in units, each mounted on a separate shaft so that the individual units are entirely independent of each other and that in this grouping of parts all of the same which perform one operation are grouped on the same shaft. By grouping the parts in this manner, the same are more readily accessible for adjustment, repairs and lubrication and, as above described, each unit, or a part thereof, may be removed from the machine independently of the other units or parts. Moreover, the mechanisms are so interconnected that the control of the machine is had by two timing shafts, one of which controls the timing of the final filling and weighing operations at the scale, the other timing shaft controlling the timing of the filling operation at the rough load hopper, and these timing shafts are in turn controlled by safety devices so that the operation of one shaft cannot be started until the other is ready to start or has completed the previous operation. In addition to the foregoing improvements, the various instrumentalities are operated and interconnected with the carrier mechanism so that the latter is prevented from moving until other parts of the machine have completed their various functions, and, moreover, the starting and stopping device for the carrier controls the operation thereof so that the motor can be started before the machine and the latter stopped while the motor and main drive shaft are running.

What is claimed is:

1. In combination, in a scale, a rough load hopper and a drip load hopper, a main power shaft, means controlling the rough load hopper driven from said main power shaft, a separate shaft on which said means are mounted, means controlling the drip load hopper driven from the main power shaft, a separate shaft on which said drip load hopper controlling means are mounted, and scale controlled means controlling the operation of the shafts driven from said main power shaft.

2. In combination, in a scale, a rought load hopper and a drip load hopper, a main power shaft, means to operate the rough load hopper driven from said main power shaft, a separate shaft on which said means are mounted, means for timing the operation of said rough load hopper shaft, a separate shaft on which said timing means are mounted, and scale controlled means controlling the operation of said last named shaft.

3. In combination, in a scale, a rough load hopper and a drip load hopper, a main power shaft, means to operate the drip load hopper driven from said main power shaft, a separate shaft on which said means are mounted, means for timing the operation of said drip load hopper shaft, a separate shaft on which said timing means are mounted, and scale controlled means controlling the operation of said last named shaft.

4. In combination, in a scale, a first load hopper and a drip load hopper, individual means for driving the first load hopper, individual means for driving the drip load hopper, timing mechanism mounted on a separate shaft for controlling the first load hopper driving means, timing mechanism mounted on a second shaft for controlling the operation of the drip hopper driving means, scale controlled means for controlling the operation of said shafts, and mechanism for preventing the operation of the drip hopper driving means until the completion of the operation of the first load hopper driving means.

5. In a machine of the character described, the combination of a main power shaft, a pair of separate shafts, a rough load hopper, means for discharging material from said hopper, driving devices for said means mounted on one of said separate shafts and adapted to be driven from said main power shaft, a drip stream hopper, means for discharging material from the drip stream hopper, driving devices for said last named means mounted on the other separate shaft and adapted to be driven from the main power shaft, a scale, and scale controlled means for controlling the operation of said driving devices.

6. In a machine of the character described, the combination of a main power shaft, rough load hopper driving devices adapted to be driven from the main power-shaft, a separate shaft on which said devices are mounted, means for timing the driving of the rough load hopper operating devices from the main power shaft, a separate shaft on which said timing means is mounted, and scale controlled means for controlling the operation of said last named shaft.

7. In a machine of the character described, the combination of a main power shaft, drip stream hopper driving devices adapted to be driven from the main power shaft, a separate shaft on which said devices are mounted, means for timing the driving of the drip stream hopper driving devices from the main power shaft, a separate shaft on which said timing means is mounted, and scale controlled means for controlling the operation of said last named shaft.

8. In a machine of the character described, the combination of a main power shaft, a pair of separate shafts, rough load hopper driving means and drip stream hopper driving means each mounted on one of said separate shafts and adapted to be driven from the main power shaft, clutches controlling the drive for said means, a scale, and scale controlled means for operating said clutches.

9. In a machine of the character described, the combination of a main power shaft, hopper operating means, a separate shaft on which said means is mounted, means for driving the hopper operating means from the main power shaft including a clutch, timing means adapted to operate said clutch, a separate shaft on which said timing means is mounted, a clutch on the timing means for driving the latter from the main power shaft, and scale controlled means for operating said last named clutch.

10. In a machine of the character described, the combination of a hopper for filling cartons, a carrier for transporting cartons past said hopper, means for driving said carrier, a main power shaft, hopper operating mechanism adapted to be driven from said main power shaft, a separate shaft on which the hopper operating mechanism is mounted, timing mechanism for controlling the operation of the carrier driving means and the driving of the hopper operating mechanism, a separate shaft on which said timing mechanism is mounted, and scale controlled means controlling the operation of said last named shaft.

11. In a machine of the character described, the combination of a table or support, a main power shaft, two spaced hopper operating mechanisms mounted on said table separately from the main power shaft, means for driving said hopper operating mechanisms intermittently from the main power shaft, timing means mounted on the table separately from the above-named elements and controlling the driving means for said hopper operating mechanisms, and scale controlled means controlling the operation of said timing means.

12. In a machine of the character described, the combination of a table, a main power shaft mounted thereon, two individual hopper operating mechanisms mounted on the table for removal therefrom independently of each other and the main power shaft, means for driving the hopper operating mechanisms from the main power shaft, timing means controlling the driving means for the hopper operating mechanisms and removably mounted on the table independently of the main power shaft and said hopper operating mechanisms, and scale controlled means controlling the operation of said timing means.

13. In a machine of the character described, the combination of a table, a main power shaft, a hopper operating mechanism detachably mounted on the table independently of the main power shaft, means for driving the hopper operating mechanisms from the main power shaft, timing means controlling the driving means for the hopper operating mechanism and detachably mounted on said table independently of the main power shaft and said hopper operating mechanism, and scale controlled means controlling the operation of said timing means.

14. In a machine of the character described, the combination of a table, a main power shaft, two individual hopper operating mechanisms driven by the main power shaft and mounted on the table for removal therefrom independently of said main power shaft, timing means driven from the main power shaft controlling the drive for the hopper operating mechanisms and detachably mounted on the table independently of the main power shaft and said hopper operating mechanisms, and scale controlled means controlling the operation of said timing means.

15. In a machine of the character described, the combination of a table, a main power shaft mounted thereon, a hopper operating mechanism intermittently driven by the main power shaft and mounted on the table for removal therefrom independently of said main power shaft, timing means intermittently driven from the main power shaft, controlling the drive for the hopper operating mechanism and removably mounted on the table independently of the main power shaft and said hopper operating mechanism, and scale controlled means controlling the operation of said timing means.

16. In a machine of the character described, the combination of a table, a main power shaft, a rough load hopper operating mechanism and a drip stream hopper operating mechanism both driven by the main power shaft and removably mounted on the table independently of each other and the main power shaft, a separate timing means for each of said hopper operating mechanisms controlling the drive therefor and detachably mounted on the table independently of the main power shaft and said hopper operating mechanisms, and scale controlled means controlling the operation of said timing means.

17. In a machine of the character described, the combination of a table, a main power shaft mounted thereon, a rough load hopper operating mechanism and a drip stream hopper operating mechanism both driven by the main power shaft and detachably mounted on the table independently of each other and said main power shaft, separately mounted timing means controlling the drive for the rough load hopper operating mechanism, separately mounted timing means controlling the drive for the drip stream hopper operating mechanism, and scale controlled means for controlling the operation of said timing means.

18. In a machine of the character described, the combination of a table, a hopper for filling cartons and supported by the table, a main power shaft, hopper operating mechanism mounted on said table independently of the main power shaft, means for driving the hopper operating mechanism from the main power shaft, a carrier for transporting cartons past the hopper, means for driving said carrier, timing means controlling the drive for the hopper operating mechanism and the operation of the carrier driving means and mounted on the table independently of the main power shaft and said hopper operating mechanism, and scale controlled means for controlling the operation of said timing means.

19. In a machine of the character described, the combination of a table, a main power shaft mounted thereon, a hopper operating mechanism mounted on the table independently of the main power shaft, means for driving the hopper operating mechanism from the main power shaft, a carrier arranged to operate adjacent the table, timing means controlling the drive for the hopper operating mechanism and the operation of said carrier and mounted on the table independently of the main power shaft and said hopper operating mechanism, and scale controlled means controlling the operation of said timing means.

20. In a machine of the character described, the combination of a table, a main power shaft mounted thereon, a rough load hopper operating mechanism and a drip stream hopper operating mechanism mounted on the table independently of each other and the main power shaft, means for driving said mechanisms from the main power shaft, a carrier arranged to operate adjacent the table, carrier controlled timing means controlling the operation of the rough load hopper operating mechanism and mounted on the table separately from the main power shaft and said rough load hopper operating mechanism, timing means controlling the operation of the drip stream hopper operating mechanism and said carrier and mounted on the table independently of the other elements carried thereby, and scale controlled means controlling the operation of said last named timing means.

21. In a machine of the character described, the combination of a scale, an endless carrier for moving packages onto and off of said scale, a driven shaft, means for moving the carrier, an intermittently operated time shaft adapted to connect said driven shaft with the carrier moving means at intervals during the operation of the machine, and scale controlled mechanical trip mechanism controlling the operation of said time shaft.

22. In a machine of of the character described, the combination of a scale, a carrier for delivering packages successively to said scale, a driven shaft, means for moving the carrier, intermittently operated timing means adapted to connect said driven shaft with the carrier moving means at intervals during the operation of the machine, mechanism controlling the operation of said timing means and adapted to be tripped by the scale, and carrier operated means for resetting said mechanism.

23. In a machine of the character described, the combination of a scale, intermittently operated timing means, mechanism controlling movement of the timing means and adapted to be tripped by said scale to start the operation of said timing means, a driven shaft, a carrier for delivering packages to the scale, means for moving the carrier adapted to be intermittently connected with said shaft by the timing means, and means on the carrier for resetting said mechanism after it has been tripped by the scale and the carrier begins to move.

24. In a machine of the character described, a main power shaft, a material discharging device, means for operating said device from the main power shaft including a separate driven shaft, timing mechanism controlling the operation of said means and including another separate shaft adapted to be driven from said main power shaft, a scale, and a scale controlled means controlling the operation of said last-named separate shaft.

25. In a machine of the character described, the combination of a scale, a hopper adjacent thereto, means for discharging material from the hopper into a package on the scale, mechanism for operating the material discharging means, a carrier for delivering packages successively to the scale, a driven shaft, carrier moving means, intermittently operated timing means adapted to alternately connect the material discharging means with its operating mechanism and the carrier moving means with said shaft, and mechanism controlling the operation of the timing means and adapted to be tripped by the scale and reset by the carrier.

26. In a machine of the character described, the combination of a scale, intermittently operated means for delivering material into a package on said scale, intermittently operated timing means controlling the operation of said material delivering means, a trip mechanism controlling movement of the timing means and adapted to be tripped by the scale to start the operation of said timing means, a driven shaft, a carrier for delivering packages successively to the scale, carrier moving means adapted to be intermittently connected with said driven shaft by the timing means, and carrier operated means for resetting said trip mechanism.

27. In a machine of the character described, a main power shaft, a material discharging device, means for operating said device including a separate shaft adapted to be driven from the main power shaft, mechanism controlling the operation of said means and including a separate driven timing shaft, a scale, and scale controlled means controlling the operation of said timing shaft.

28. In a machine of the character described, the combination of a main power shaft, a rough load hopper, means for discharging material therefrom, a drip stream hopper, means for a discharging material therefrom, operating units for said means mounted on separate shafts and adapted to be driven with their respective shafts from said main power shaft, a scale, and scale controlled means for controlling the drive for said units from their separate shafts.

29. In a machine of the character described, a main power shaft, a separate shaft adapted to be driven therefrom, a material discharging device, a clutch controlling the operation of said device and carried on said separate shaft, timing mechanism controlling the operation of said clutch and including another separate shaft adapted to be driven from said main power shaft, a second clutch controlling the operation of said timing mechanism and carried on the last-named separate shaft, a scale, and scale controlled means controlling the operation of the second clutch.

30. In a machine of the character described, a main power shaft, a carton carrier, means for driving said carrier, a material discharging device in the path of travel of the carrier, means for operating said device including a separate shaft adapted to be driven from the main power shaft, mechanism controlling the operation of both of said means and including another separate shaft adapted to be driven from said main power shaft, a scale, and scale controlled means controlling the operation of said last-named separate shaft.

31. In a machine of the character described, a driving shaft, a carton carrier, means for driving the carrier from said shaft, a material discharging device in the path of travel of said carrier, operating means for said device including a separate driven shaft, mechanism controlling the operation of both of said means and including another separate driven shaft, a scale, and scale controlled means controlling the operation of said last-named separate shaft.

32. In a machine of the character described, the combination of a main power shaft, a rough load hopper, means for discharging material therefrom, a drip stream hopper, means for discharging material therefrom, operating mechanisms for said means mounted on separate shafts and adapted to be driven therewith from said main power shaft, a scale, timing means mounted separately from said mechanisms and controlling the drive for the latter through their separate shafts, and scale controlled means controlling the operation of said timing means and including a trip mechanism and an intermittently moving carrier.

33. In a machine of the character described, the combination of a main power shaft, a rough load hopper, means for discharging material therefrom, a drip stream hopper, means for discharging material therefrom, operating mechanisms for said means mounted on separate shafts and adapted to be driven therewith from said main power shaft, a separate timing device for each of said mechanisms and controlling the drive therefor, and scale controlled means controlling the operation of said timing devices and including a trip mechanism operatively related with the timing device for the drip stream hopper operating mechanism and a carrier mechanism operatively related with the timing device for the rough load hopper operating mechanism.

34. In a machine of the character described, the combination of a rough load hopper and a drip stream hopper, means for discharging material from said hoppers, means for driving said material discharging means, two intermittently operated timing devices controlling the operation of said driving means, a scale adjacent one of the hoppers, a carrier for delivering packages successively to said scale and controlling the operation of one of said timing devices, a driven shaft, carrier moving means adapted to be intermittently connected with said shaft by the other timing device, and scale controlled means controlling the operation of the last named timing device.

35. In a machine of the character described, the combination of a rough load hopper and a drip stream hopper, means for discharging material from said hoppers, means for driving said material discharging means, two intermittently rotated time shafts controlling the operation of said driving means, a scale adjacent one of the hoppers, means for conveying packages successively to said scale and controlling the operation of one of said time shafts, a driven shaft, driving mechanism for the package conveying means adapted to be intermittently connected with said driven shaft by the other time shaft, and scale controlled means controlling the operation of said last named time shaft and including a trip mechanism operatively related therewith.

36. In a machine of the character described, the combination of a carrier, means for driving the same, including a driving shaft, a driven shaft, and a clutch arranged to connect the driving shaft with and disconnect the same from said driven shaft, a latch controlled mechanism controlling the operation of the clutch devices for moving the latch controlled mechanism at intervals whereby the same is caused to intermittently connect said driving means with the carrier through said clutch, and a scale controlling the operation of said devices.

37. In a machine of the character described, the combination of a carrier, means for driving the same, a latch controlled mechanism adapted to connect the driving means with the carrier and operating by its own weight to disconnect the last named elements, devices for moving the latch controlled mechanism at intervals whereby the same is caused to intermittently connect said driving means with the carrier, and a scale controlling the operation of said devices.

38. In a machine of the character described, the combination of a carrier, means for driving the same, a latch controlled mechanism adapted to connect the driving means with the carrier and normally disconnecting the last named elements, devices for moving the latch controlled mechanism at intervals whereby the same is caused to intermittently connect the driving means with the carrier, a scale, and scale controlled means controlling the operation of said latch moving devices.

39. In a machine of the character described, the combination of a carrier, means for driving the same, a latch controlled mechanism adapted to connect the driving means with said carrier, a scale, scale controlled devices for moving the latch controlled mechanism whereby the same is caused to connect the driving means with the carrier, and means operated by the latch controlled mechanism for moving the scale beam to its initial position before the carrier begins to move.

40. In a machine of the character described, the combination of a carrier, means for driving the same, latch controlled mechanism adapted to connect the driving means with the carrier, devices for moving the latch controlled mechanism at intervals whereby the same is caused to intermittently connect the driving means with the carrier, a scale controlling the operation of said devices, and a device on the driving means engaging the latch controlled mechanism at intervals whereby the same is caused to intermittently disconnect the driving means from the carrier.

41. In a machine of the character described, the combination of a carrier, means for driving the same, devices adapted to connect the driving means with the carrier and normally disconnecting said last named elements, a latch forming part of the devices and normally providing a connection therebetween, means for moving the latched devices in one direction whereby the same are caused to connect the driving means with said carrier, a scale controlling the operation of both of said means, and carrier operated means for disconnecting the latch whereby said devices may move in the opposite direction to disconnect said driving means.

42. In a machine of the character described, the combination of a carrier, means for driving the same, latch connected devices operatively related with the driving means, timing means for moving the latch connected devices whereby the latter are caused to connect the driving means with the carrier, a scale controlling the operation of said timing means, and carrier operated means adapted to disconnect said devices whereby one of the same may move into position to disconnect the driving means from the carrier.

43. In a machine of the character described, the combination of a rough load hopper, means for discharging material therefrom, driving mechanism for said means, a drip stream hopper, means for discharging material therefrom, driving mechanism for said last named means, a separate intermittently operated timing device for each of said mechanisms and controlling the operation thereof, a carrier, means for driving said carrier, a scale, mechanism for connecting the carrier with its driving means and controlled by the scale and the timing device for the drip stream hopper driving mechanism, and means controlled by the timing device for the rough load hopper driving mechanism and adapted to prevent connection of the carrier driving means with the carrier until the rough load hopper timing device has completed its cycle of operation.

44. In a machine of the character described, the combination of a rough load hopper, means for discharging material therefrom, driving mechanism for said means, a drip stream hopper, means for discharging material therefrom, driving mechanism for said last named means, timing means controlling the operation of said mechanisms and comprising two separately mounted intermittently rotated time shafts, a carrier, means for driving said carrier, a scale, mechanism for connecting said carrier with its driving means and controlled by the scale and one of said time shafts, and means for preventing connection of the carrier driving means with the carrier until the other time shaft has completed its cycle of operation.

45. In a machine of the character described, the combination of a hopper, means for discharging material therefrom, an intermittently operated timing device controlling the operation of said material discharging means, a carrier, means for driving the carrier, a scale, scale controlled means controlling movement of the carrier by its driving means, and means for preventing movement of the carrier until said timing device has completed its cycle of operation.

46. In a machine of the character described, the combination of a hopper, means for discharging material therefrom, driving mechanism for said means, a carrier, means for driving the carrier and said driving mechanism alternately, a scale, scale controlled mechanism controlling movement of said carrier by its driving means, and means for preventing movement of the carrier until said driving mechanism has completed its cycle of operation.

47. In a machine of the character described, the combination of a rough load hopper, means for discharging material therefrom, driving mechanism for said discharging means, a drip stream hopper, means for discharging material therefrom, driving mechanism for said last named discharging means, a carrier, means for driving said carrier, a scale, scale controlled means controlling the operation of the drip stream hopper driving mechanism and the carrier driving means, and means for preventing movement of the carrier until the rough load hopper driving mechanism has completed its operation.

48. In a machine of the character described, the combination of a rough load hopper, means for discharging material therefrom, driving mechanism for said discharging means, a drip stream hopper, means for discharging material therefrom, driving mechanisms for said last named discharging means, a carrier, means for driving said carrier, a scale, scale controlled means controlling the operation of the carrier by its driving means, and means acting in event the scale trips prematurely, to prevent movement of the carrier until the rough load hopper driving mechanism has completed its operation.

49. In a machine of the character described, the combination of a carton carrier, means for driving the same, mechanism controlling said driving means including levers movable to connect the driving means with the carrier, a hopper, means for discharging material therefrom, driving mechanism, for said discharging means, and means for preventing movement of said levers until said driving mechanism has completed its operation.

50. In a machine of the character described, the combination of means for filling cartons, a carrier for feeding cartons past said filling means, intermittently operated means for driving the carrier, a scale, scale controlled mechanism controlling the intermittent operation of said driving means, and means normally preventing movement of said mechanism adapted to be manually released therefrom whereby the driving means may be connected with the carrier.

51. In a machine of the character described, the combination of means for filling cartons, a carrier for feeding cartons past said filling means, means for driving the carrier, a scale, scale controlled mechanism controlling the operation of said driving means, a latch normally preventing movement of said mechanism, and manually operable means for releasing the latch from said mechanism whereby the carrier driving means may be connected with the carrier.

52. In a machine of the character described, the combination of a carrier for transferring cartons through the machine, a scale, scale controlled means for driving said carrier, a latch controlled device releasable to connect the driving means with the carrier, means for feeding cartons to the carrier, carton operated devices adjacent the feeding means, and means connecting the carton operated devices with said latch controlled device whereby the latter is released to connect the carrier driving means with the carrier on proper engagement of a carton with said carton operated devices.

53. In a machine of the character described, the combination of a carrier for transferring cartons through the machine, a scale, scale controlled means for driving said carrier, a clutch device releasable to connect the driving means with the carrier, a latch adapted to hold said clutch device in its inoperative position, means for feeding cartons to the carrier, carton operated devices adjacent the feeding means, and means connecting the carton operated devices with said latch whereby the latch is released when a carton is in the proper position in front of said feeding means.

54. In a machine of the character described, a main power shaft, a hopper, a device for controlling the delivery of material from said hopper, means for operating said device, mechanism for controlling the operation of said means and including a separate timing shaft adapted to be driven from said main power shaft, a scale, and scale controlled means controlling the operation of said separate timing shaft.

55. In a machine of the character described, a main power shaft, a carton carrier, means for driving said carrier, a hopper adjacent the path of travel of the carrier, a device for controlling the delivery of material from the hopper, means for operating said device, mechanism for controlling the operation of both of said means and including a separate shaft adapted to be driven from said main power shaft, a scale, and scale controlled means controlling the operation of said separate shaft.

In testimony whereof I have signed this specification.

GEORGE A. ROBINSON.